Oct. 7, 1969  J. L. SWIGERT  3,470,655
BEARING SEAL CONSTRUCTION
Filed June 7, 1967
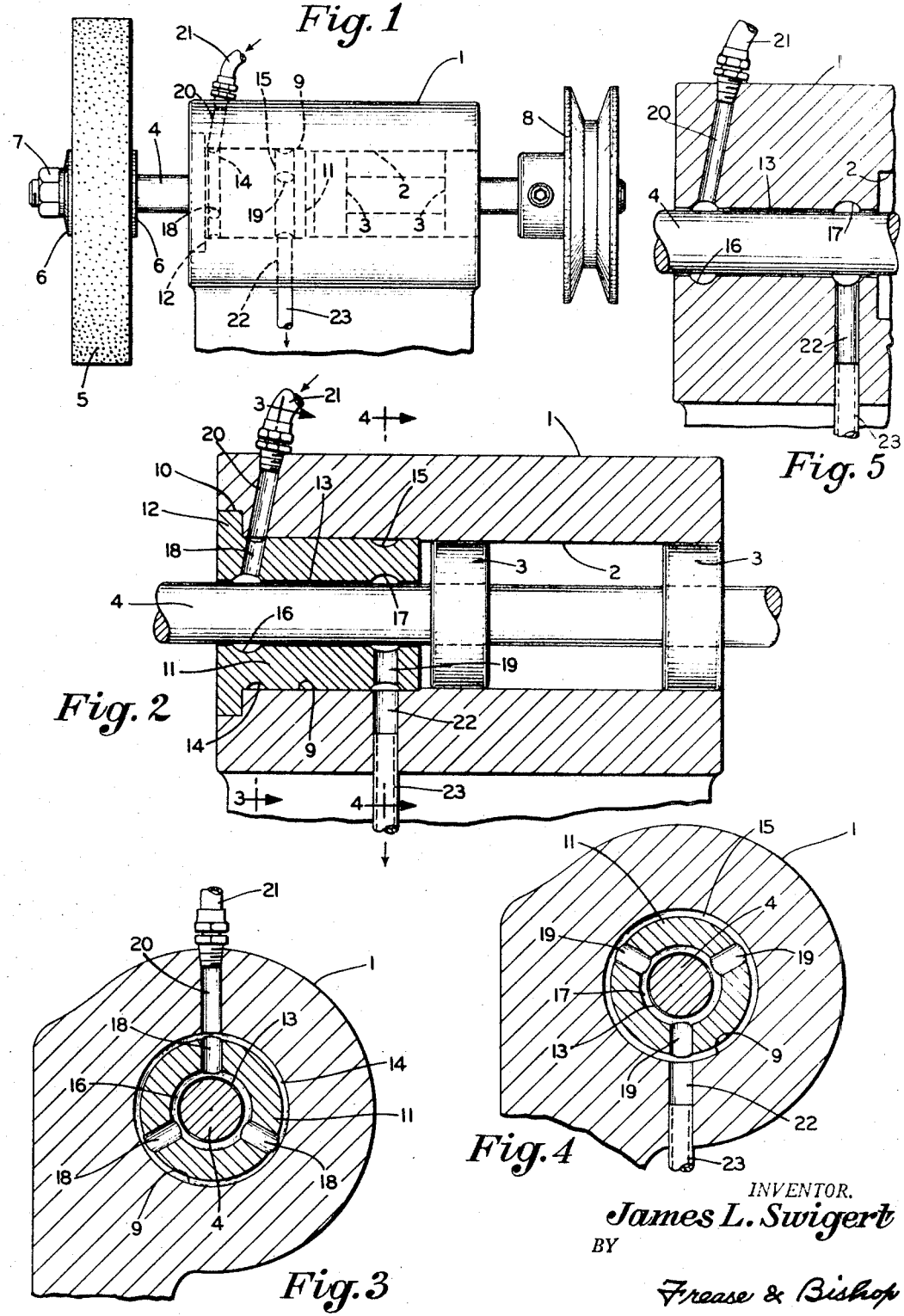
INVENTOR.
James L. Swigert
BY
Frease & Bishop
ATTORNEYS

United States Patent Office 3,470,655
Patented Oct. 7, 1969

3,470,655
BEARING SEAL CONSTRUCTION
James L. Swigert, 219 Parkhill Drive, R.D. 2,
Newcomertown, Ohio 43832
Filed June 7, 1967, Ser. No. 649,067
Int. Cl. F16j 15/40, 15/54
U.S. Cl. 51—168
8 Claims

ABSTRACT OF THE DISCLOSURE

A bearing seal construction for the shaft of a grinding wheel and the like, in which a rotatable shaft carrying the grinding wheel is journalled in bearings within a housing. A sleeve is located in the housing between the grinding wheel and the bearings and has a slight clearance around the shaft. Spaced outer annular grooves are located in the periphery of the sleeve near the wheel and bearing ends of the sleeve, and each is connected with a corresponding inner groove in the bore of the sleeve. Air under pressure is admitted to the outer groove in the wheel end of the sleeve and an exhaust passage connects with the outer groove in the bearing end of the sleeve.

BACKGROUND OF THE INVENTION

Field of the invention

The invention relates to a seal construction for the bearings of a rotating shaft and more particularly to such a seal especially adapted for application to the shaft of a grinding wheel to protect the bearings thereof from abrasives.

In large grinders such as are used for heavy industrial grinding, difficulty is encountered with the bearings for the grinding wheel shaft. Fine grindings of the material being ground, and of the wheel, are usually very abrasive. These grindings, together with lubricant used in the grinding operation, usually work their way along the shaft of the grinding wheel and into the shaft bearings causing considerable damage and wear upon the bearings which thus wear out or break down very quickly.

Description of the prior art

Attempts have been made to provide seals for shaft bearings but to applicant's knowledge no satisfactory device has been provided for properly protecting the shaft bearings of a grinding wheel, prior to his invention.

SUMMARY OF THE INVENTION

In general terms, the invention may be described briefly as comprising an air pressure seal for the shaft bearings of a grinding wheel or the like. Such grinding wheels usually include a housing with spaced antifriction bearings therein, the grinding wheel shaft being located through the bearings with the grinding wheel upon one end thereof and means connected to the other end of the shaft for rotating the same.

The seal comprises a sleeve of brass, stainless steel, plastic, or other suitable material, located within the housing and surrounding the shaft on the wheel side of the bearings. This sleeve has a slight clearance around the shaft.

Spaced annular outer grooves are formed in the periphery of the sleeve near the ends thereof, and corresponding inner grooves are formed in the bore of the sleeve. One or more radial passages connect the outer and inner grooves at the wheel end of the sleeve, and one or more radial passages connect the outer and inner grooves at the bearing end of the sleeve.

The passage or passages connecting the outer and inner grooves at the wheel end of the sleeve are preferably inclined inwardly and toward the wheel. A similarly inclined passage through the housing communicates with the outer groove at the wheel end of the sleeve and is connected by a hose or tube to a suitable supply of air under pressure. An air exhaust passage in the housing communicates with the outer groove of the sleeve at the bearing end thereof.

An object of the invention is to provide a simple and efficient bearing seal construction for grinding wheels and the like.

Another object of the invention is the provision of such a seal operated by air pressure.

A further object of the invention is to provide a seal of the character referred to in which a sleeve is inserted in the bearing housing and surrounds the shaft between the bearing and the grinding wheel, said sleeve having spaced connected inner and outer grooves with means for admitting air under pressure thereto and discharging the air therefrom.

The above objects together with others which will be apparent from the drawing and following description, or which may be later referred to, may be attained by constructing the improved bearing seal in the manner hereinafter described in detail and illustrated in the accompanying drawing.

BRIEF DESCRIPTION OF THE DRAWING

FIG. 1 is a side elevation of a grinding wheel provided with the improved bearing seal construction;

FIG. 2 is an enlarged longitudinal sectional view through the housing and the sleeve;

FIG. 3 is a transverse sectional view on the line 3—3, FIG. 2, at the wheel end of the housing and sleeve;

FIG. 4 is a similar section on the line 4—4, FIG. 2, at the bearing end of the housing and sleeve; and FIG. 5 is a fragmentary longitudinal sectional view of a modified form of the invention.

DESCRIPTION OF THE PREFERRED EMBODIMENT

Referring now more particularly to the embodiment of the invention illustrated, the housing for an industrial grinder is indicated at 1, having a longitudinal bore 2 therethrough within which are mounted spaced antifriction bearings 3, which may be ball bearings or the like.

A shaft 4 is journalled through the bearings 3 and has the grinding wheel 5 fixed to one end thereof by any suitable means such as the washers 6 and nut 7, and means such as a pulley 8 connected to its other end for applying power means for rotating the same.

Abrasive grindings, together with lubricant used in the grinding operation, gather upon the shaft 4 and find their way along the shaft and into the bearings, particularly the one nearest the wheel. For the purpose of sealing the bearings to prevent the abrasive mixture from damaging the same, the housing 1 may be lengthened toward the left end as viewed in the drawing, and provided with a bore 9, which may be slightly larger in diameter than the bore 2.

This bore may have an enlarged outer end portion 10 and receives a sleeve 11 of brass, stainless steel, plastic, or other suitable material having a peripheral flange 12 at its outer end. The sleeve is inserted into the bore 9 of the housing with the flange portion 12 received in the enlargement 10 of the bore.

The sleeve has a bore 13 which provides clearance of from 0.006″ to 0.010″ in diameter around the shaft 4. Spaced outer annular grooves 14 and 15 are formed in the periphery of the sleeve near the wheel end thereof and the bearing end thereof, respectively.

Corresponding inner grooves 16 and 17 are formed in the bore 13 of the sleeve. One or more radial passages 18, preferably inclined inwardly and toward the wheel, as shown in FIG. 2, provide communication between the outer groove 14 and inner groove 16. One or more radial passages 19 provide communication between the outer groove 15 and the inner groove 17.

An inlet passage 20 which may be inclined inwardly and toward the wheel, as shown in FIG. 2, is located through the housing 1 and communicates with the outer groove 14 at the wheel end of the sleeve 11. A hose or tube 21 may connect the same to a suitable source of compressed air, which is preferably at a pressure at least 1 pound per square inch greater than the air pressure around the grinding wheel. An exhaust passage 22 in the housing 1 connects the outer groove 15 with an exhaust bore or tube 23.

For economic reasons, it is preferable that the improved seal may be formed with a removable insert 11 so that when the same becomes worn it may be removed and replaced with a new insert. However, instead of providing a removable insert, the bore 13 may be formed in the housing 1 itself. This, of course, would eliminate the necessity of the outer grooves 14 and 15 and the radial passages 18 and 19. The inlet passage 20 would communicate directly with the inner groove 16 and the outlet passage 22 would connect directly with the inner groove 17.

OPERATION

In the operation of the device, when the wheel 5 is being rotated at high speed for grinding, air under suitable pressure is continuously admitted through the hose 21 and inlet passage 20 to the outer groove 14, the air thus passing through the passages 18 to the inner groove 16, and most of it is exhausted around the shaft 4 through the clearance in the bore 13 of the sleeve, at the left hand or wheel end of the sleeve.

Any air which may pass along the shaft to the inner groove 17 is exhausted therefrom through the openings 19, outer groove 15 and exhaust passage 22 and hose 23. This prevents any foreign material, such as abrasive grindings and the like, from traveling along the shaft 4 and reaching any of the bearings 3.

In the foregoing description certain terms have been used for brevity, clearance and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of a preferred embodiment thereof, and the advantageous new and useful results obtained thereby; the new and useful construction, and reasonable mechanical equivalents thereof obvious to those skilled in the art, are set forth in the appended claims.

I claim:

1. In a grinder comprising a housing having a bore therethrough, spaced antifriction bearings located in said bore, a shaft journalled through said bearings and a grinding wheel on one end of said shaft, a bearing seal construction comprising a sleeve inserted in said bore around the shaft between the wheel and the bearings, the sleeve having a bore receiving the shaft, spaced outer annular grooves in the periphery of the sleeve, corresponding inner grooves in the bore of the sleeve, means forming communication between each other groove and the corresponding inner groove, an inlet passage in the housing communicating with the outer groove toward the wheel, means for admitting fluid under pressure to said inlet passage, and an exhaust passage in the housing communicating with the inner groove toward the bearings.

2. In a grinder as defined in claim 1, said bearing seal construction having a clearance of from 0.006" to 0.010" in diameter around the shaft.

3. In a grinder as defined in claim 1, said bearing seal construction having a plurality of radial passages between the outer grooves and inner grooves.

4. In a grinder as defined in claim 3, said bearing seal construction having said inlet passage and the radial passages between the outer groove toward the wheel and the corresponding inner groove inclined toward the wheel.

5. In a grinder as defined in claim 1, said bearing seal construction having the sleeve formed of brass.

6. In a grinder as defined in claim 1, said bearing seal construction having the sleeve formed of stainless steel.

7. In a grinder as defined in claim 1, said bearing seal construction having the sleeve formed of plastic.

8. In a grinder as defined in claim 1, said bearing seal construction having the portion of the bore in the housing in which the sleeve is located of slightly larger diameter than the portion in which the bearings are located.

References Cited

UNITED STATES PATENTS

| 2,299,119 | 10/1942 | Yeomans | 308—36.3 |
| 2,803,928 | 8/1957 | Frager et al. | 51—168 |
| 2,823,496 | 2/1958 | Winter | 51—168 |
| 3,032,889 | 5/1962 | Chipalkatti et al. | 308—36.3 X |
| 3,385,009 | 5/1968 | Lueders | 51—168 |

LESTER M. SWINGLE, Primary Examiner

U.S. Cl. X.R.

277—75; 308—36.3